Figure 1:
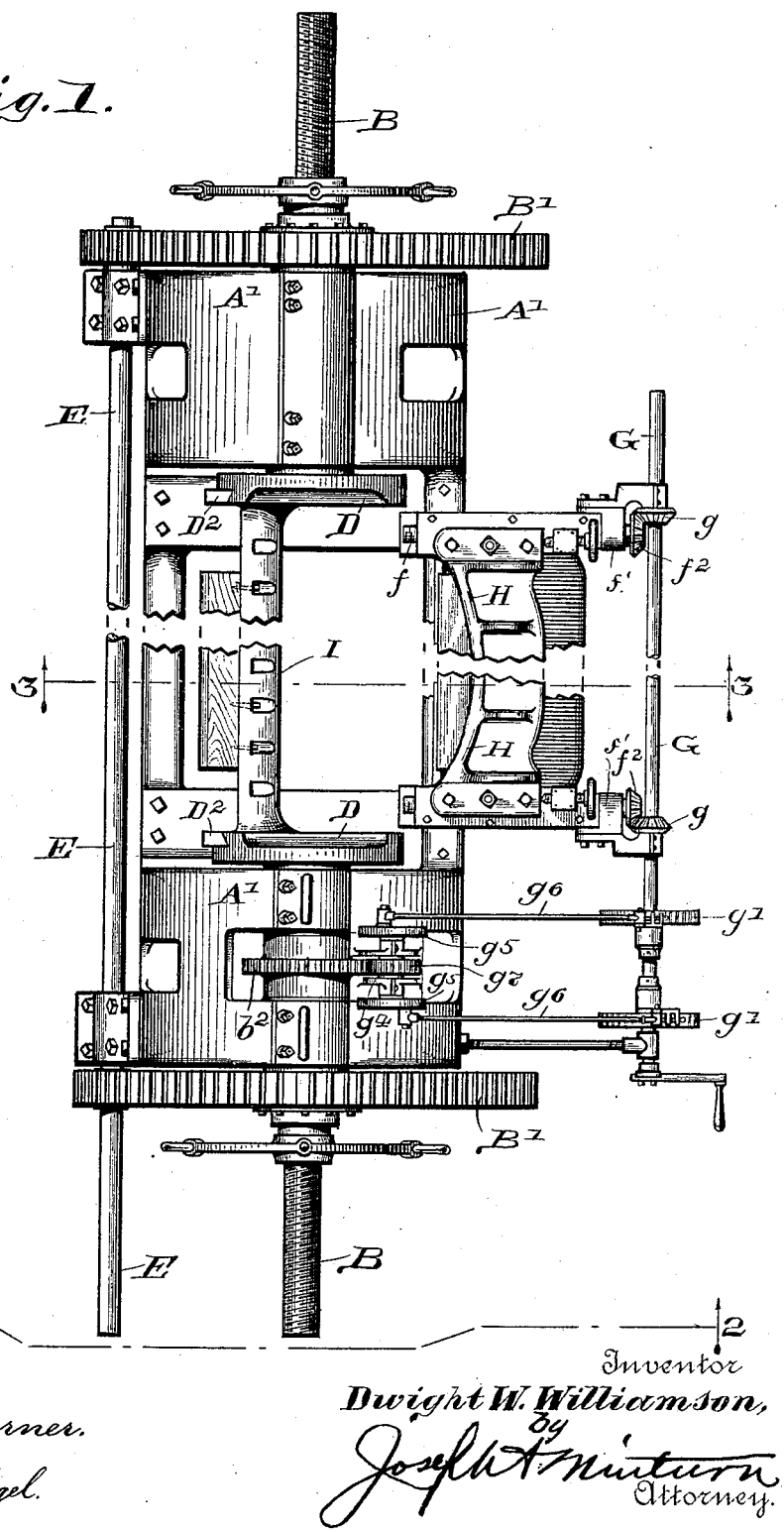

No. 615,773. Patented Dec. 13, 1898.
D. W. WILLIAMSON.
VENEER MACHINE.
(Application filed Feb. 10, 1896.)

(No Model.) 6 Sheets—Sheet I.

Witnesses
F. W. Woerner.
Carl Schlegel.

Inventor
Dwight W. Williamson,
by Joseph A. Minturn
Attorney.

No. 615,773. Patented Dec. 13, 1898.
D. W. WILLIAMSON.
VENEER MACHINE.
(Application filed Feb. 10, 1896.)
(No Model.) 6 Sheets—Sheet 2.
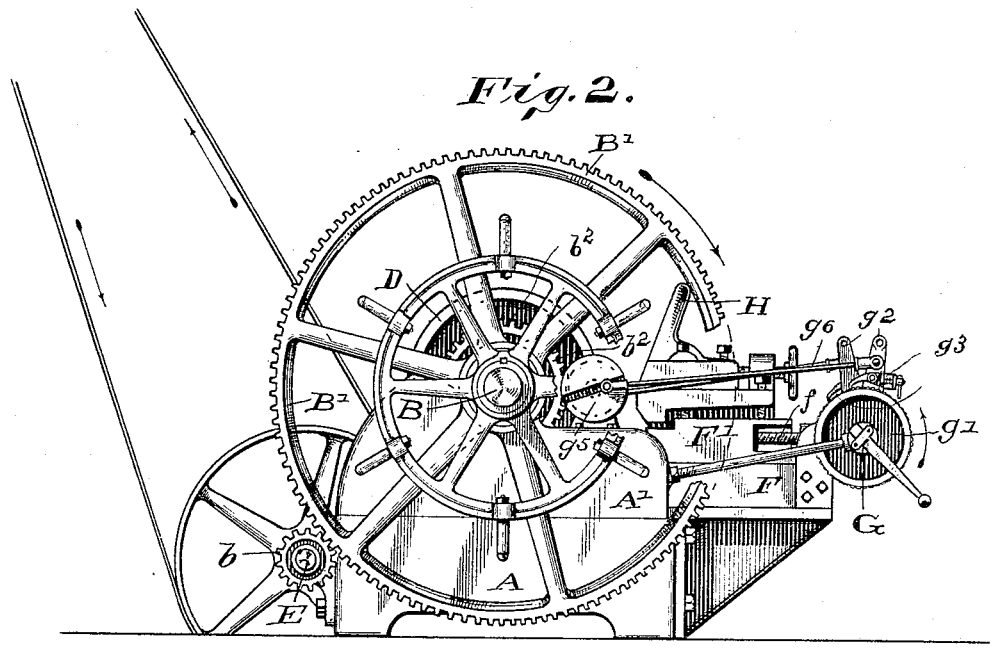
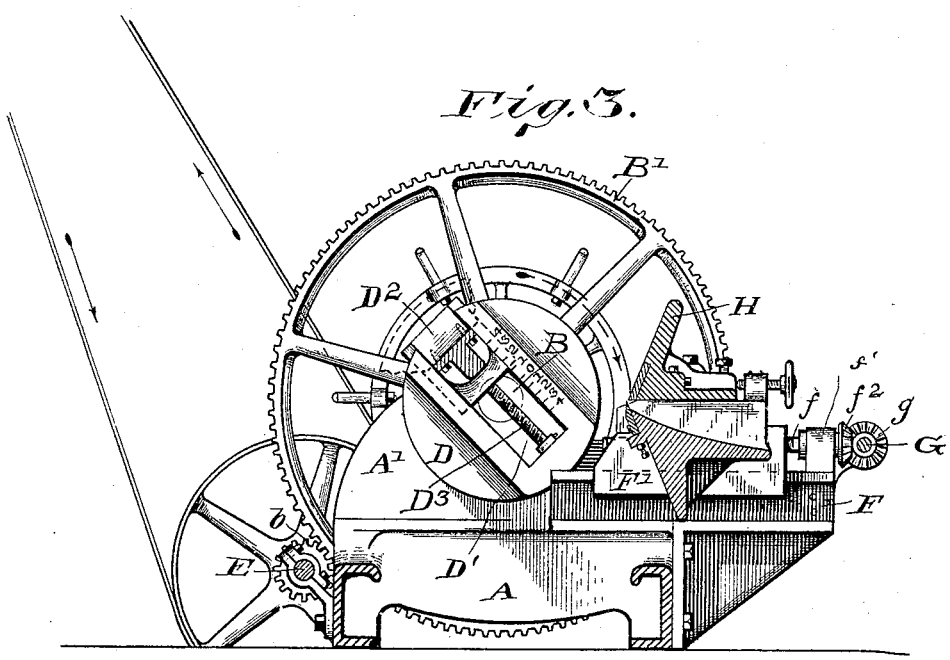
Witnesses
F. W. Woerner.
Carl Schlegel.
Inventor
Dwight W. Williamson.
By Joseph A Minturn
Attorney.

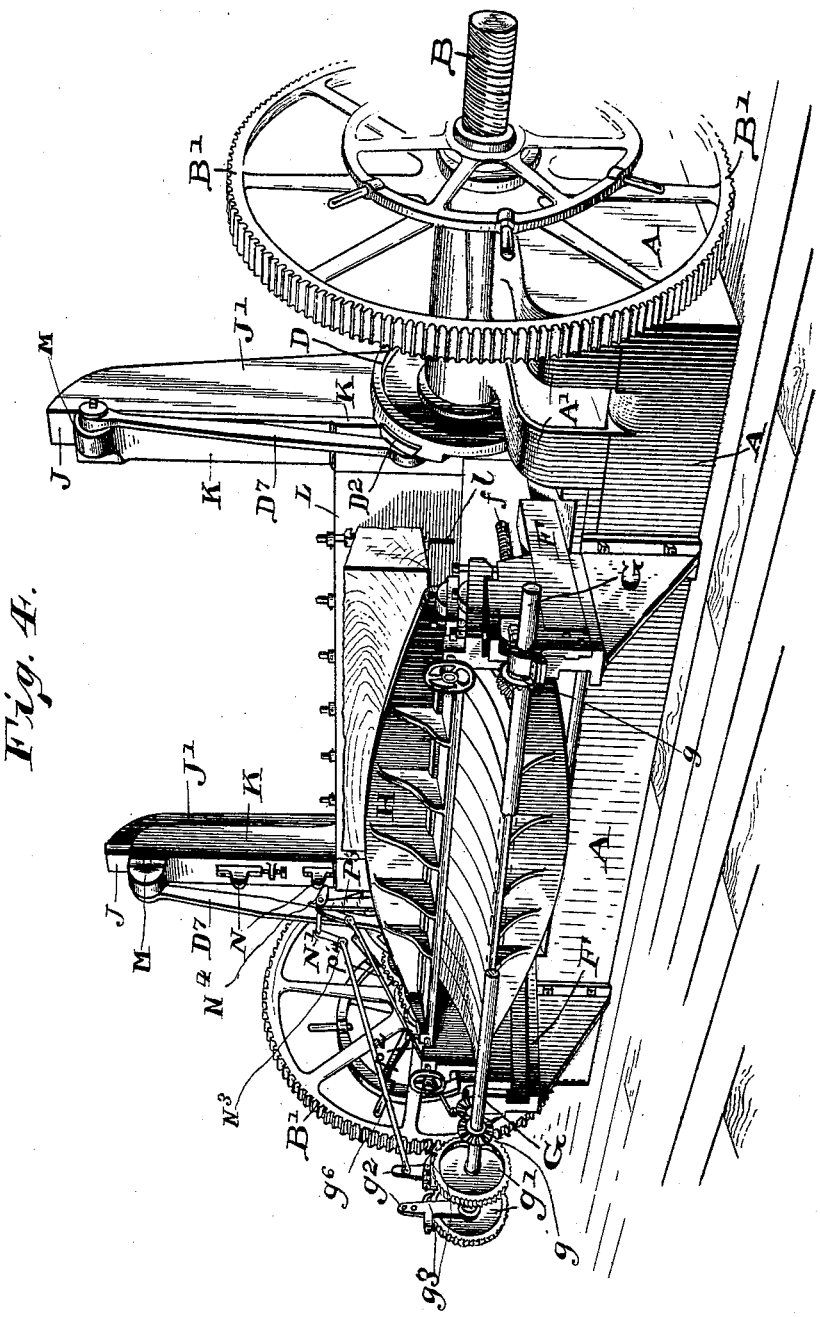

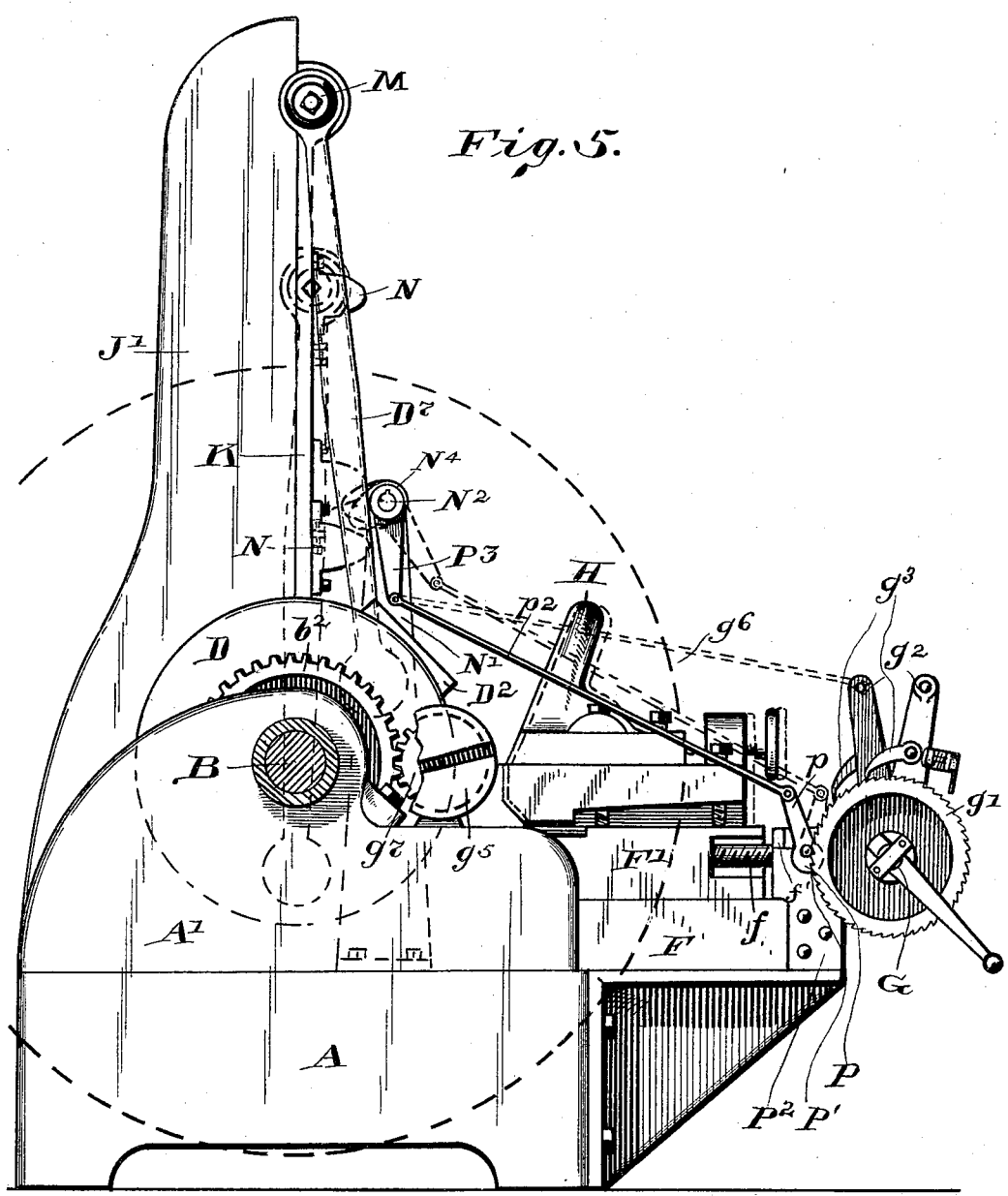

No. 615,773. Patented Dec. 13, 1898.
D. W. WILLIAMSON.
VENEER MACHINE.
(Application filed Feb. 10, 1896.)
(No Model.) 6 Sheets—Sheet 5.
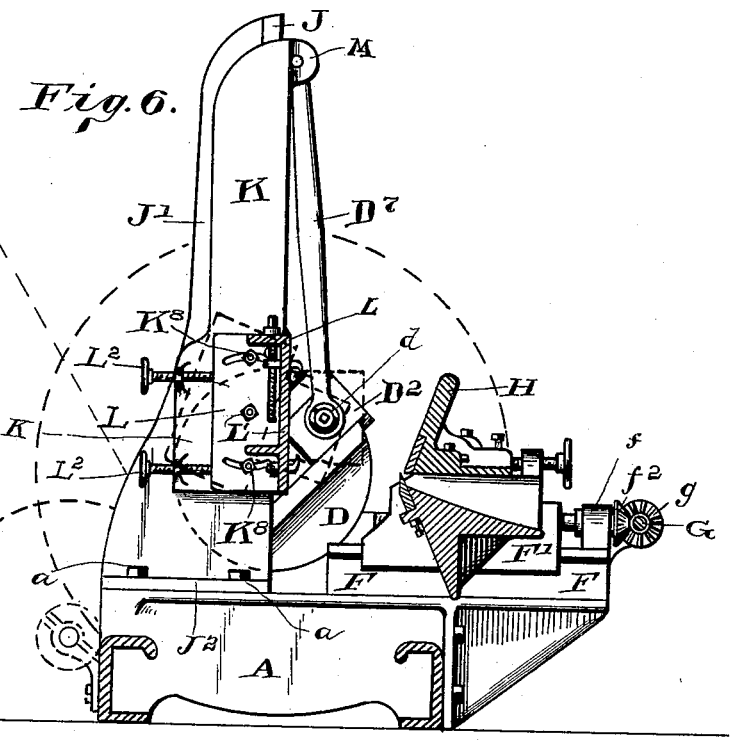
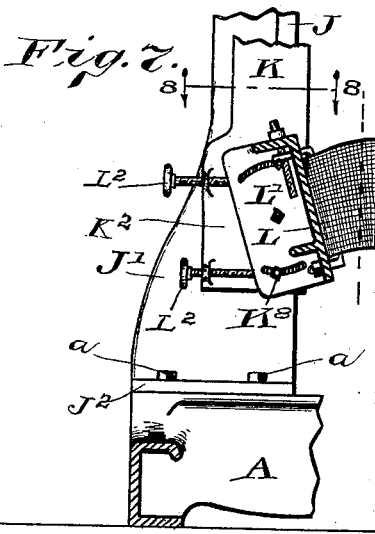
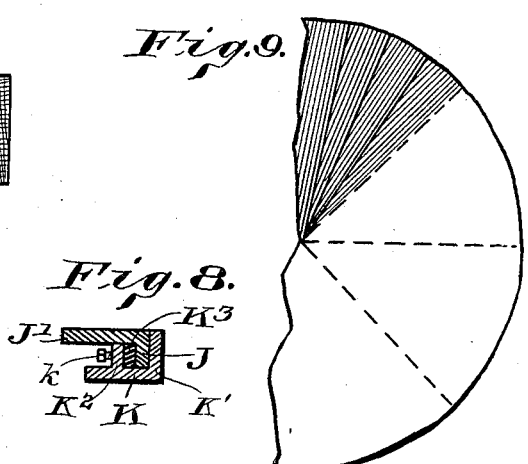
WITNESSES:
F. W. Woerner.
Carl Schlegel.
INVENTOR
Dwight W. Williamson,
BY
Joseph A. Minturn
ATTORNEY.

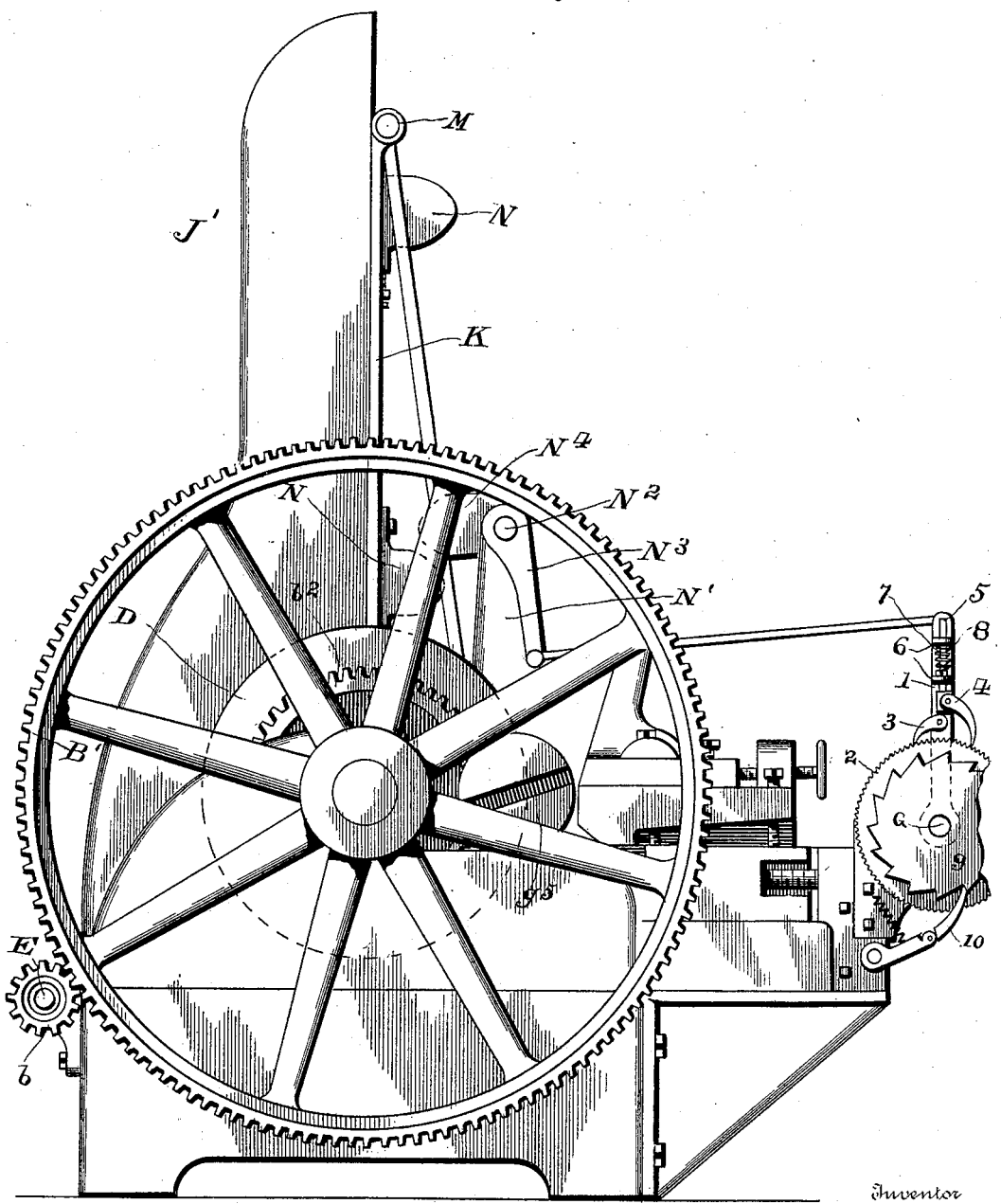

UNITED STATES PATENT OFFICE.

DWIGHT W. WILLIAMSON, OF INDIANAPOLIS, INDIANA.

VENEER-MACHINE.

SPECIFICATION forming part of Letters Patent No. 615,773, dated December 13, 1898.

Application filed February 10, 1896. Serial No. 578,763. (No model.)

*To all whom it may concern:*

Be it known that I, DWIGHT W. WILLIAMSON, a citizen of the United States, residing at Indianapolis, in the county of Marion and State of Indiana, have invented certain new and useful Improvements in Veneer-Machines; and I do hereby declare the following to be a full, clear, and exact description of the invention, such as will enable others skilled in the art to which it appertains to make and use the same.

In the manufacture of veneers for cabinet-work the aim is to cut the log so as to show the grain of the wood in its greatest contrast of colors and irregularities of arrangement of fiber, and on account of the lack of uniformity in the same log much care and skill is required to obtain the best results. For example, it often happens that three or four inches of the outer portion of the log is marked in a manner different from the middle portion, so that a straight-cut veneer would show up handsomely throughout the middle with plain strips along each edge. In such cases it often happens that the outside of the log requires different handling from the inside—that is, requires to be curve-cut instead of being straight-cut—or one whole side of a log may be different from the other side and require different handling to secure the best results.

The object of this invention is to provide a veneer-cutting machine which can be readily changed from a curve-cut to a straight-cut machine or the reverse, as the special treatment of the log to be cut up into veneers may require.

The object, also, is to improve the feed mechanism to present the log more nearly on radial lines for quarter-cut veneers and to increase the efficiency of the machine in various ways, such as will be specially pointed out and claimed.

The objects of the invention are accomplished by the mechanism illustrated in the accompanying drawings, in which—

Figure 1 is a plan view of the machine arranged to cut the veneers by a curved cut. Fig. 2 is an end elevation of the same. Fig. 3 is a central transverse section, the chuck being shown as it is arranged when straight veneers are to be cut. Fig. 4 is a perspective view of the machine arranged to cut straight veneers. Fig. 5 is an enlarged end view of the same. Fig. 6 is a transverse section thereof. Fig. 7 is a detail view showing the adjustment of the log holding or clamping plate. Fig. 8 is a detail sectional view of the guides and slides. Fig. 9 is a diagrammatic view showing how the log is divided into longitudinal sections so as to best bring out the "quartered" effect of the grain, and Fig. 10 is a partial end elevation showing a modification.

Similar letters and figures of reference indicate like parts throughout the several views of the drawings.

A is the bed-plate, having vertical end extensions or head-blocks A', which support journal-boxes, within which are mounted the mandrels B. On the outer ends of the mandrels are the spur-gears B' and on the inner ends are the chucks D. E is the driving-shaft, which will be actuated in the usual manner and having the pinions $b$ mounted on the shaft and meshing with the large wheels B'. All of this mechanism may be and is of well-known and usual construction, with the possible exception of the bed-plate at the parts adjacent to and underlying the chucks, which will be formed into a suitable platform to support the removable guide to be used in the adaptation of the machine for straight-cut work.

F are ways transverse with relation to the length of the bed-plate of the machine. F' are slides integral with the knife-plate carrying the cutter-bar that cuts the veneer from the log. These slides rest and travel on the ways F and are actuated by means of the screws $f$, which pass through threaded nuts in the slides and are held from longitudinal movement by means of a lug or boxing $f'$, secured to the ways. The outer ends of the screws $f$ terminate with the bevel-wheels $f^2$, which mesh with the bevel-wheels $g$ on the shaft G, said shaft being driven from one of the mandrels B by means of mechanism which will be hereinafter described.

H represents the cap to which the pressure-bar is fastened.

The bed-plate F, slides F', cap H, and pressure-bar are all of usual construction.

When the machine is to be used for curve-cutting veneers from a log, a clamping-plate I, connecting the two chucks D, will be bolted into place in the usual manner and the log to be cut will be clamped to the said plate. The knife or cutter-bar is moved in toward the log at a fixed rate which regulates the thickness of the veneer to be cut, and by the revolution of the log against the knife the thin layer of wood constituting the veneer is taken off of the circumference of the log. The feed of the knife toward the log is accomplished by rotating the shaft G, which through the medium of the bevel-gears previously described actuates the screws that move the bed-plate F, to which the knife is bolted. The revoluble movement of the shaft G is accomplished by providing a pair of ratchet-wheels $g'$, levers $g^2$, pivoted to the shaft and carrying pawls $g^3$ to engage the teeth of the ratchet-wheels, the said levers being connected, by means of rods $g^6$, with crank-wheels $g^5$ on the ends of a counter-shaft $g^4$ and counter-shaft $g^4$ being connected with the mandrel B by means of spur-gears $g^7$ and $b^2$. As this is an old and familiar feed further description is deemed unnecessary.

The transformation of a curve-cut into a straight-cut machine is the novel feature of this invention, and the mechanism and special construction whereby this is accomplished will now be described.

After the removal of the clamping-plate I the guides J are bolted to the bed-plate A. The guides stand in a vertical position, as clearly shown in Figs. 6 and 7, and are provided with the right-angled longitudinal stiffening and strengthening flanges $J'$ and with the horizontal bases $J^2$. The bases $J^2$ rest upon the platform-surfaces of the bed-plate A, previously referred to, and are fastened by means of the bolts $a$, extending through the bases $J^2$ into the bed-plate A.

K are slides shaped in cross-section as shown in Fig. 8. The groove formed by the flanges $K'$ and $K^2$ is wider than the thickness of the guide J in order to admit the slide K into position freely on the guide, after which the gib $K^3$ is inserted and tightened up by means of the set-screws $k$. The lower inner face of the slide is expanded at $K^7$ to form flat bearing-faces for the end plates of the clamping-plate L. A guide J and slide K will be located at each end of the machine, as shown in Fig. 4, and the clamping-plate L will connect the faces $K^7$, being pivotally secured thereto by means of the bolts $L'$. The plate L will have a rotary adjustment around the bolts $L'$, subject to the control of the set-screws $L^2$, whereby any desired adjustment may be retained. Slots concentric with the bolts $L'$ are provided, through which the additional fastening-screws $K^3$ will be projected and screwed into threaded openings in the plate $K^7$. The set-screws $L^2$ pass through threaded openings in the lugs $L^3$, which lugs are integral with the plate $K^7$. The purpose of this adjustment of the clamping-plate L will be hereinafter fully explained.

As shown at M, the upper end of the slides K will be provided with eyes, through which a wrist-pin will be projected and fastened to the slide. The chuck or disk D has the beveled way $D'$ in its face. This way affords means whereby the clamping-plates I are secured to the said chucks, and when the machine is changed into a straight-cut machine blocks $D^2$ will be secured in said ways, as shown most clearly in Fig. 3. A set-screw $D^3$ enables the block in each chuck to be placed any desired distance from the center of the chuck. These blocks are each provided with crank-pins $d$.

$D^7$ is a connecting-rod connecting the crank-pin on the chuck with the wrist-pin on the slide, whereby a reciprocating movement will be transmitted from the chucks to the slides.

The log to be cut into veneers will be clamped to the plate L, the slots $l$ being provided in the plate L in the usual manner for that purpose.

In making straight-cut veneers the thickness is regulated by moving the cutter-bar in toward the log just before the cut is made. This is all done by one inward impulse immediately after the return of the log and before the beginning of the cutting stroke. This is accomplished automatically as follows: A pair of adjustable blocks N are secured to the slide K, as shown in Figs. 4 and 5. A standard $N'$, bolted to the block $A'$ or to the bed-plate of the machine, has bearings at its upper end, wherein the shaft $N^2$ is mounted. A nose $N^4$, keyed to the shaft $N^2$, intercepts the paths of the blocks N, and a rocking movement is thereby imparted to the shaft. An arm $N^3$ is mounted on the shaft and moves with it, and by connecting the end of the arm with the lever $g^2$, carrying the pawls to engage one of the ratchet feed-wheels $g'$, the shaft G will be rotated by the inward movement of the arm $N^3$ and the pawls carried back into position for a new throw of the shaft G by the return or outward movement of the arm. The position of the connecting-rod from the arm to the lever is shown by the dotted lines in Fig. 5, and the same rod $g^6$ may be used by disconnecting it from the crank-wheel and connecting it with the arm. With the straight-cut feed only one of the ratchet-wheels $g'$ will be used, the other being disconnected by removing its connecting-rod.

To keep the log from scraping against the cutter-bar on its return after cutting off a veneer, it is necessary to provide means whereby the cutter-bar can be thrown back to give the necessary clearance. This is accomplished by moving the whole bed-plate, to which the cutter-bar is fastened, back a thirty-second of an inch. Play enough to allow for this movement is provided between the screw and the box-bearing by which the screw is secured to the ways on which the bed-plate slides. Pivotally secured to the said box-bearing is the cam P, working in the vertical slot $P'$ in the plate $P^2$, bolted to the stationary way. The cam is provided with an arm $p$. An arm $P^3$ on the rock-shaft $N^2$ is connected by the rod $p^2$ with the arm $p$. The movement of the rock-shaft $N^2$ shifts the cam, so as to throw the bed-plate in or out. The above-described mechanism is used at both ends of the bed-plate, so as to move both ends at once.

What is known as "quarter-sawed" or "quarter-cut" veneers is the result of making the line of separation of the veneers conform as near as possible with the natural lines radiating from the center of the log. Fig. 9 represents a half-log and the dotted lines show approximately how the log is divided for convenience in handling on the veneer-machines. The shaded lines in the top section show how the veneers ought to be taken off to get the best results, and to do this necessitates turning the log at a different angle toward the knife at frequent intervals. It is to facilitate this turning of the log without the necessity of removing it from the machine that the adjustment of the clamping-plate, as shown in Figs. 6 and 7, is provided. The adjustment is held by means of the set-screws and is so well illustrated that further description is deemed unnecessary.

Fig. 10 shows a modification in which the clearance between the log and the knife on the return stroke of the log is secured by a backward or reverse movement of the screw G. The ratchet-wheel has straight teeth, so it can be moved in either direction by oppositely-working pawls. The lever 1 is pivoted to the shaft G and is actuated from an arm $N^3$ on the rock-shaft $N^2$, as shown. The ratchet-wheel 2 is keyed to the shaft G in the usual manner. 3 is a pawl pivoted to the lever and arranged to turn the ratchet-wheel in the direction to throw the knife in toward the log a distance equal to the desired thickness of the veneer to be cut. 4 is a pawl arranged so as to turn the ratchet-wheel in the opposite direction from that given it by the pawl 3, and instead of being pivoted directly to the lever 1 the pawl 4 is pivoted to the lower end of the rod 5. The lever 1 has the two lugs 6 with openings making a close fit for the rod 5, which is projected therethrough. The rod is threaded to receive the nut 7, which rests on top of the lower one of the lugs 6. Between the nut 7 and the upper one of the lugs is a spiral spring 8, through which the rod 5 is projected. 9 is a ratchet-wheel secured to the wheel 2. 10 is a jointed pawl pivoted to the stationary frame of the machine and engaging the ratchets in the wheel 9. The joint allows the pawl to bend a certain distance till the adjacent ends come in contact and form a lock. The bend in the pawl is sufficient to afford the necessary backward movement of the ratchet-wheels and the shaft G to give clearance between the log and knife on the return movement of the log. The operation of this mechanism is as follows: The inward feed is made by the inward movement of the lever 1 and its pawl 3 acting on the ratchet-wheel 2. Then at the beginning of the outward stroke of the lever 1 the movement of the ratchet-wheel 2 is reversed by the pawl 4 until the reverse movement of the wheel 2 is arrested by the locking of the joint in the pawl 10 and the consequent immediate arrest of the ratchet-wheel 9, which is fastened to the wheel 2. During the remaining stroke of the lever 1 the wheel 2 remains stationary and the pawl 4 is accommodated by the upward movement of the rod 5.

I claim—

1. In a changeable veneer-cutting machine, the combination with a pair of centrally-alined revoluble mandrels, a bed-plate connecting the two mandrels and having suitable bearings to receive them, and chucks or disks secured to the inner ends of each of said mandrels, of vertical guides removably secured to the bed-plate adjacent to the chucks, slides mounted on said guides and connected with a wrist-pin on its nearest chuck whereby a reciprocating movement of the slides on the guides at each revolution of the chucks will be secured, a clamping-plate, the said plate having slots whereby a log to be cut into veneers can be fastened to the plate, and a knife to cut the veneers from the log, all substantially as described and for the purposes specified.

2. The combination, with the mechanism employed for curve-cutting veneers, of blocks with wrist-pins secured to the chucks in place of the clamping-plate, guides removably secured to the bed-plate of the machine adjacent to each of the chucks and having a wrist-pin on the side next to the chuck, rods connecting the pin on each of the slides with the pin on its nearest chuck, a clamping-plate connecting the two slides and removably and adjustably secured thereto, a knife to cut the veneers from the log which logs will be clamped to the aforesaid plate and screws actuated automatically from the slides and adapted to move the knife in toward the log to regulate the thickness of the veneer to be cut.

3. In a veneer-machine, the combination with the slides K having flat expanded inside faces to form a bearing for the ends of an adjustable clamping-plate and each slide having a pair of set-screws substantially as described, of a clamping-plate connecting the two slides together, said plates having expanded ends and a central opening through each of said ends for the insertion of a bolt whereby the plate is pivotally secured to the slides, and each of said expanded ends having slots above and below the pivot and concentric therewith bolts projected through the slots into the slides to assist the pivots in holding the clamping-plates in place, substantially as described and specified.

4. In a straight-cut veneer-machine, the combination, with the reciprocating log-carrier, of blocks secured to said carrier, a rocking shaft having a nose intercepting the paths of the reciprocating blocks whereby the shaft will be rocked a sliding bed-plate having a knife to cut the veneers from the log, secured thereto, and mechanism connecting the rock-shaft with the bed-plate whereby the movement of the shaft in one direction will feed the knife-bed with its attached knife in toward the log so as to cut the required thickness of veneer, and on the return movement of the shaft will move the bed-plate back only a part of the distance of the forward feed, for the purposes specified.

In testimony whereof I affix my signature in presence of two witnesses.

DWIGHT W. WILLIAMSON.

Witnesses:
JOSEPH A. MINTURN,
F. W. WOERNER.